United States Patent
Wang

(10) Patent No.: US 11,041,561 B2
(45) Date of Patent: Jun. 22, 2021

(54) STRUCTURE OF ENGINE TRANSMISSION BOX

(71) Applicant: KWANG YANG MOTOR CO., LTD., Kaohsiung (TW)

(72) Inventor: Chun-Kai Wang, Kaohsiung (TW)

(73) Assignee: KWANG YANG MOTOR CO., LTD., Kaohsiung (TW)

(*) Notice: Subject to any disclaimer, the term of this patent is extended or adjusted under 35 U.S.C. 154(b) by 0 days.

(21) Appl. No.: 17/027,652

(22) Filed: Sep. 21, 2020

(65) Prior Publication Data

US 2021/0156466 A1 May 27, 2021

(30) Foreign Application Priority Data

Nov. 27, 2019 (TW) ................................ 108215758

(51) Int. Cl.
| F16H 57/04 | (2010.01) |
| F16H 57/02 | (2012.01) |
| F16H 57/031 | (2012.01) |
| F16H 57/027 | (2012.01) |
| F16H 57/035 | (2012.01) |

(52) U.S. Cl.
CPC ......... F16H 57/031 (2013.01); F16H 57/027 (2013.01); F16H 57/035 (2013.01); F16H 57/0416 (2013.01); F16H 2057/0203 (2013.01)

(58) Field of Classification Search
CPC ...... F16H 57/027; F16H 57/03; F16H 57/031; F16H 57/035; F16H 57/0415; F16H 57/0416; F16H 2057/0203
See application file for complete search history.

(56) References Cited

U.S. PATENT DOCUMENTS

| 7,029,244 B2* | 4/2006 | Anderson | F04D 25/02 417/362 |
| 7,497,288 B2* | 3/2009 | Tsukada | F01P 5/06 180/68.1 |
| 7,981,179 B2* | 7/2011 | Nobuhira | B01D 46/0041 55/385.3 |
| 9,366,331 B2* | 6/2016 | Eberhardt | F16H 57/0416 |
| 9,863,523 B2* | 1/2018 | Stocks | F16H 57/0416 |
| 10,502,310 B2* | 12/2019 | Doveri | B60K 11/06 |

FOREIGN PATENT DOCUMENTS

| EP | 1880934 A2 * | 1/2008 | ......... F16H 57/0489 |
| EP | 2827024 A1 * | 1/2015 | ........... F16H 57/035 |
| JP | 2006029486 A * | 2/2006 | ......... F16H 57/0415 |

* cited by examiner

Primary Examiner — Adam D Rogers
(74) Attorney, Agent, or Firm — Leong C. Lei

(57) ABSTRACT

A structure of an engine transmission box is provided. The transmission box includes a transmission box body and a cover arranged on and covering the transmission box body. The transmission box includes at least one airflow entrance opening and an air outlet opening. The cover includes an air inlet port portion, which has an air inlet opening, and a filter member arranged outside of the air inlet opening. An airflow guide hood is arranged to cover the air inlet port portion. The filter member is located between the airflow guide hood and the air inlet port portion. With such an arrangement, a space is guaranteed inside the transmission box, and cleaning or replacement engineering of the filter member is made easy.

12 Claims, 6 Drawing Sheets

STRUCTURE OF ENGINE TRANSMISSION BOX

TECHNICAL FIELD OF THE INVENTION

The present invention relates to a structure of an engine transmission box, and more particularly to a structure of an engine transmission box that, on the one hand, secures a space in an interior of the transmission box, and, on the other hand, eases cleaning or replacement engineering of a filter member.

DESCRIPTION OF THE PRIOR ART

As shown in FIG. 1, a belt continuously variable transmission system arranged inside an engine transmission box generates a high temperature when put into operation with high speed rotation. To reduce the internal temperature of the transmission box, manufacturers provide the transmission box with a cover 1 that is formed with an airflow entrance opening 11 in a front side and an air outlet opening 12 in a rear side, and external cool air enters through the airflow entrance opening 11 to cool the belt continuously variable transmission system. Hot air generated with the cooling operation is then discharged out of the transmission box through the air outlet opening 12. To prevent external dust or moisture from entry by entraining the cool airflow to contaminate the belt continuously variable transmission system, at a portion of a front part of an inner side of the cover 1 that is adjacent to the airflow entrance opening 11, a separation board 13 that is provided with a filter member 14 is arranged to separate the front part of the cover 1 that is adjacent to the airflow entrance opening 11 into a filter space, meaning the external air, when entering the cover 1 through the airflow entrance opening 11, is not allowed to directly move into the transmission box for performing cooling and is, instead, first subjected to forced filtering by the filter member 14 in the filter space and is then moved into the transmission box to carry out cooling of the belt continuously variable transmission system.

The above-described cooling structure of the transmission box is effective in cooling, in a clean manner, the belt continuously variable transmission system. However, the cover 1 is mounted to a left-side case body of the crankcase to form the transmission box, and the filter member 14 must be cleaned or parts replaced after a period of operation. At the time for cleaning or parts replacement for the filter member 14, the cover 1 must be removed from the crankcase before the cleaning or replacement engineering can be carried out. This causes certain engineering complication and difficulty for cleaning or replacement of the filter member 14.

SUMMARY OF THE INVENTION

The primary objective of the present invention is to provide a structure of an engine transmission box, which is mainly for overcoming the drawback that cleaning or replacement engineering of a conventional cooling air filter member of a transmission box is complicated.

For such a purpose, the primary technical solution according to claim 1 of the present invention is to provide a structure of an engine transmission box, wherein the transmission box includes a transmission box body and a cover arranged on and covering the transmission box body; the transmission box comprises at least one airflow entrance opening and an air outlet opening, wherein the cover comprises an air inlet port portion, the air inlet port portion comprising an air inlet opening, and a filter member arranged outside of the air inlet opening, the air inlet port portion being provided with and covered by an airflow guide hood, the filter member being located between the airflow guide hood and the air inlet port portion.

The efficacy that the primary technical solution according to claim 1 of the present invention may achieve is that, on the one hand, a space is guaranteed inside the transmission box and, on the other hand, cleaning or replacement engineering of the filter member is eased.

DETAILED DESCRIPTION OF THE PREFERRED EMBODIMENT

For better understanding of the structure of the present invention and the efficacy that can be achieved thereby, a detail description will be provided below, with reference to the attached drawings.

Figure 1:
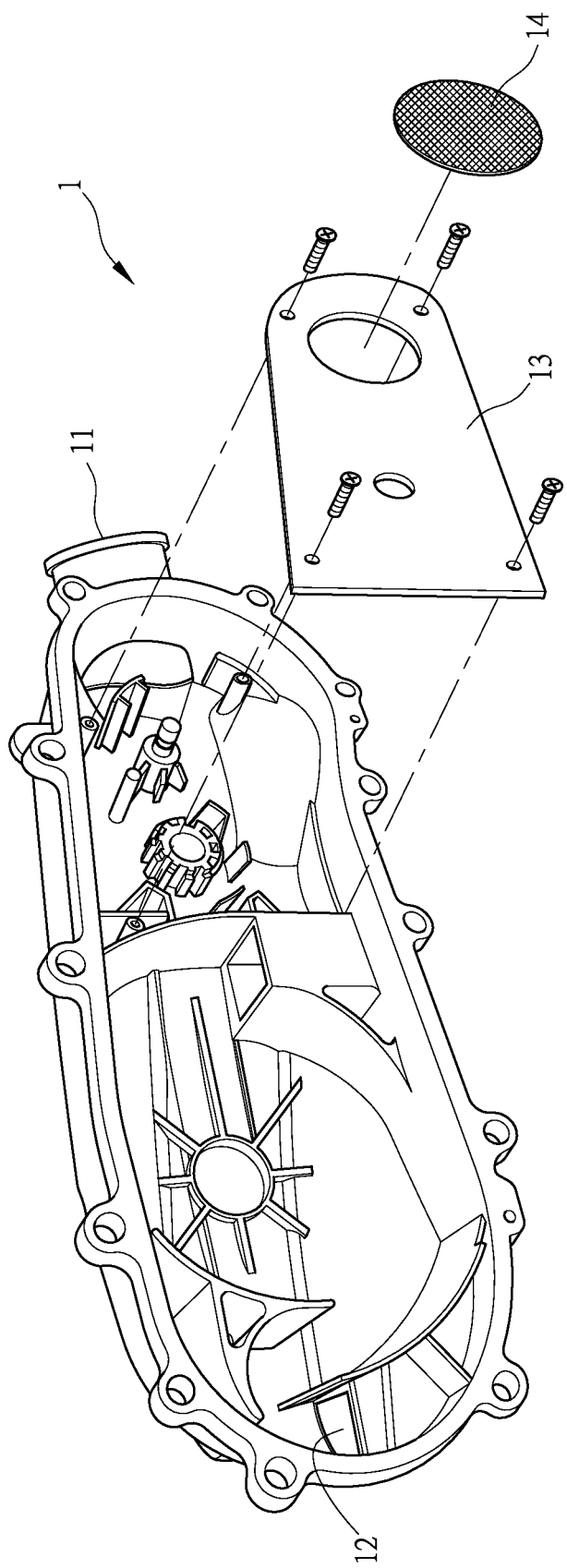
FIG. 1 is a schematic view showing a conventional engine transmission box cover.
Figure 2:
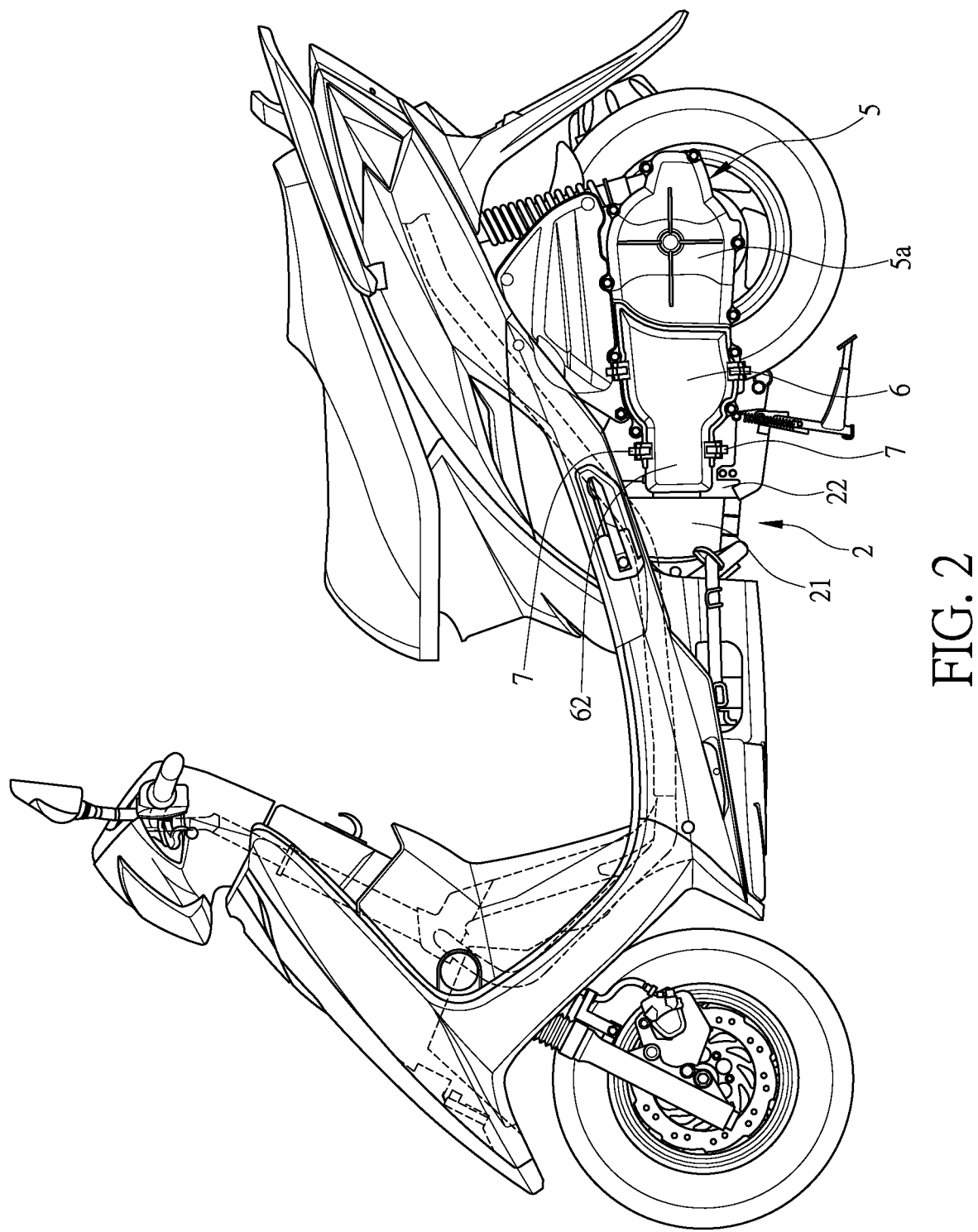
FIG. 2 is a schematic view showing an arrangement of an engine according to the present invention.
Figure 3:
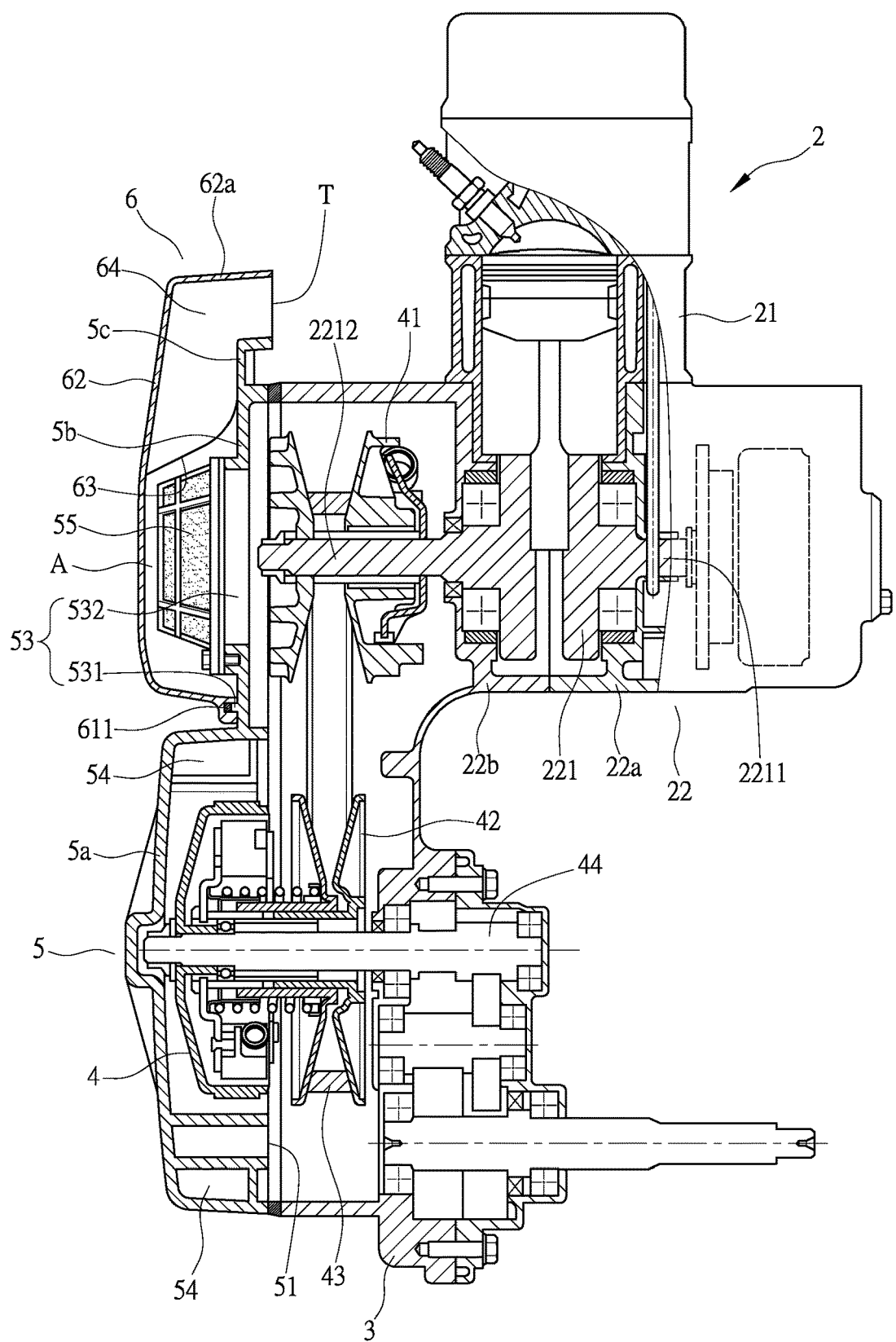
FIG. 3 is a cross-sectional view showing the engine according to the present invention.
Figure 4:
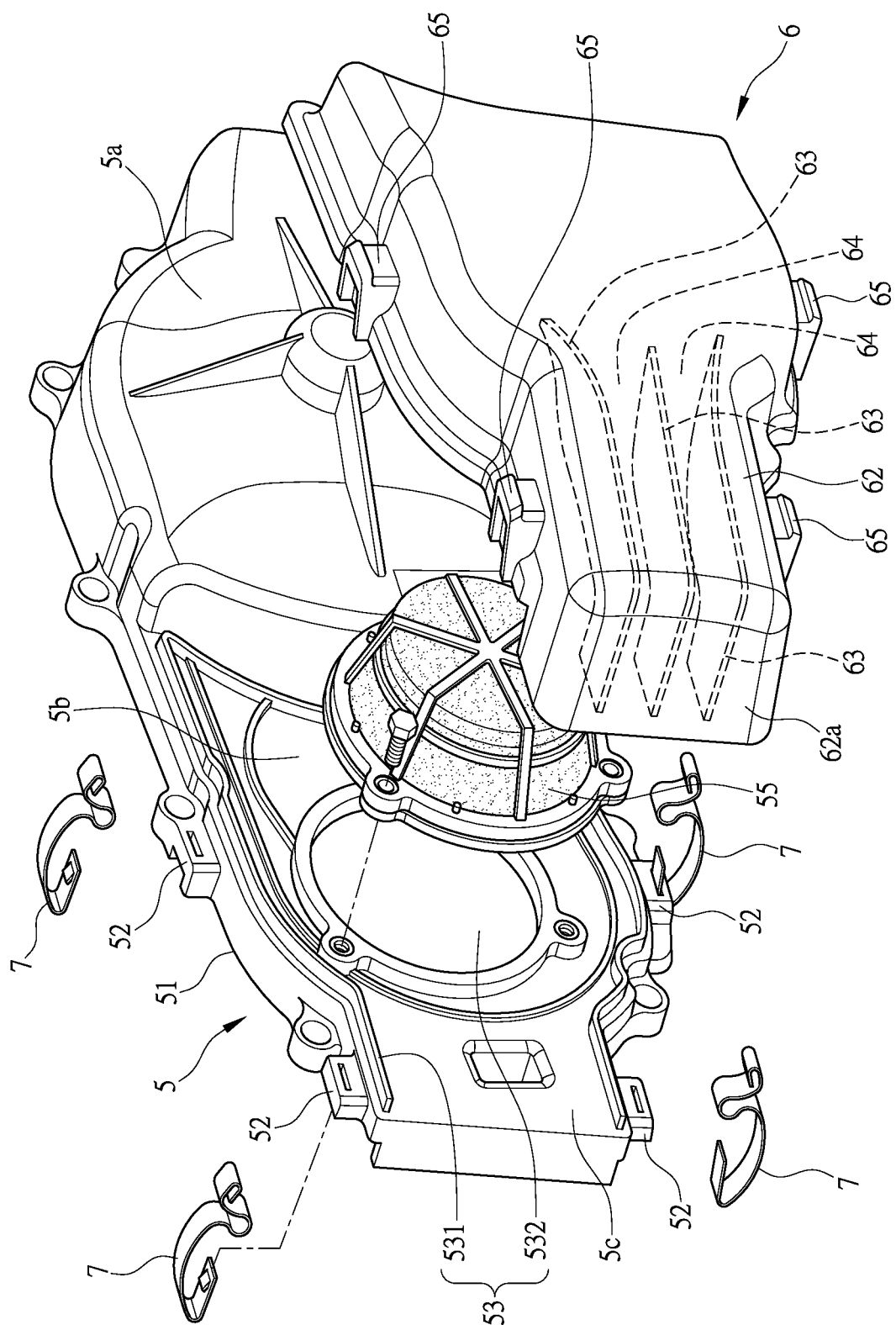
FIG. 4 is a perspective view showing a transmission box cover and an airflow guide hood according to the present invention.
Figure 5:
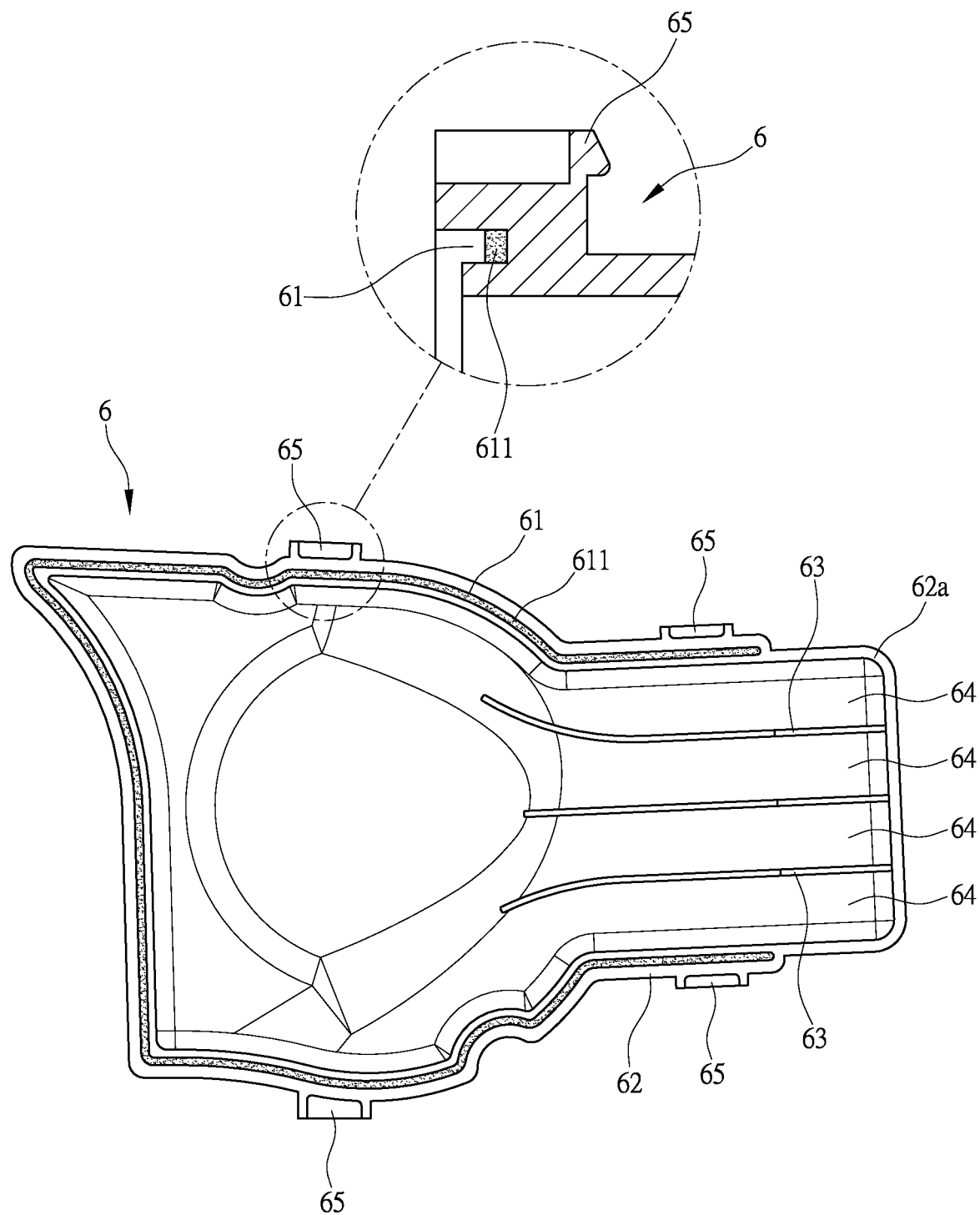
FIG. 5 is a schematic view showing another side of the airflow guide hood according to the present invention.
Figure 6:
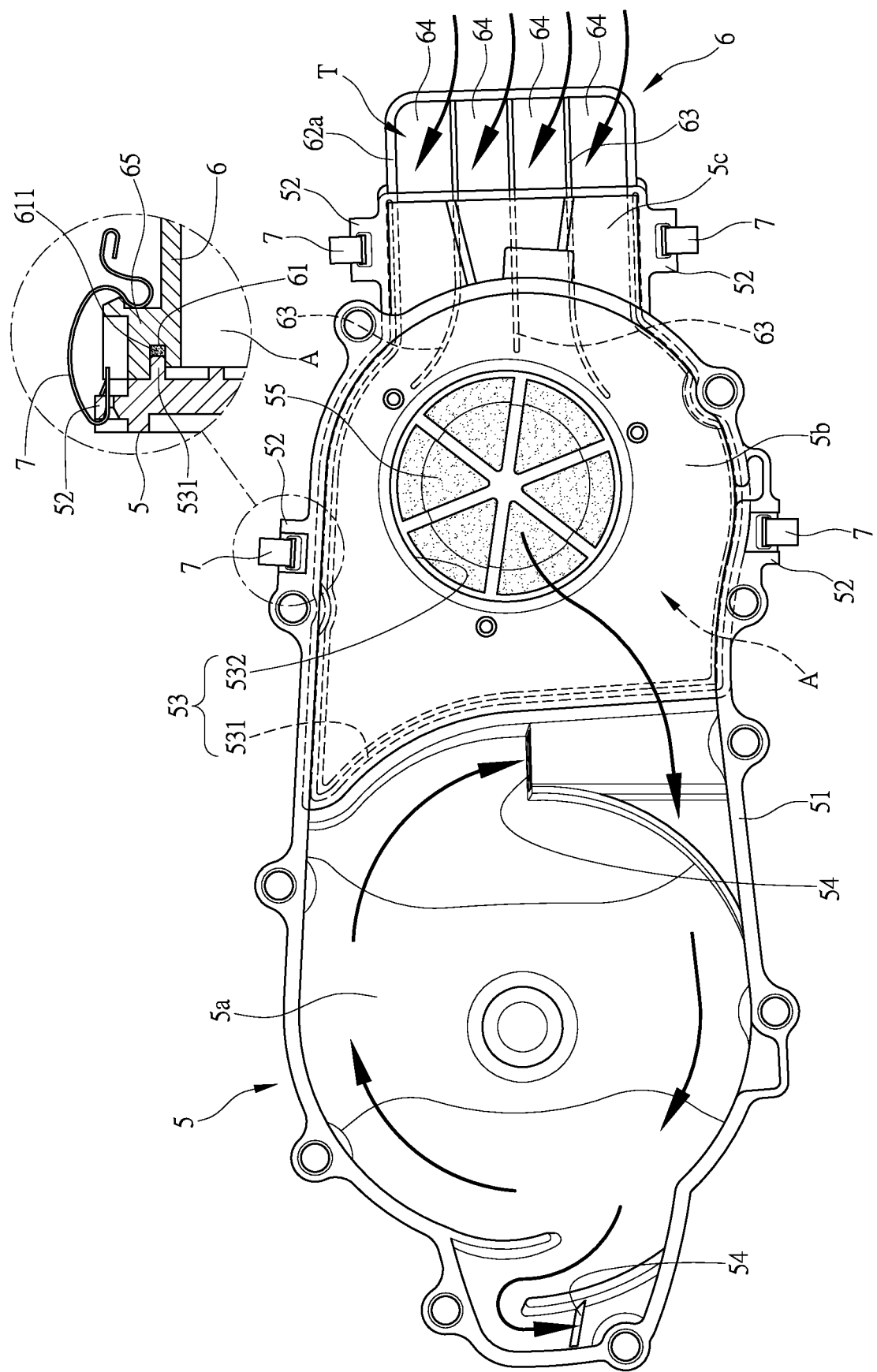
FIG. 6 is a schematic view illustrating movement of cooling airflow in the transmission box cover and the airflow guide hood according to the present invention.

Firstly, referring to the illustrations of FIGS. 2 and 3, for a structure of an engine transmission box according to the present invention, an engine 2 includes a cylinder portion 21, the cylinder portion 21 being connected to a crankcase 22, the crankcase 22 being provided therein with a crankshaft 221, the crankshaft 221 being extended, toward two sides in a vehicle body right-left direction, to form output shafts 2211, 2212, the crankcase 22 being connected, at one side thereof (a left side of the vehicle body), to a transmission box 3, the transmission box 3 being provided with a belt continuously variable transmission system 4.

As shown in FIG. 3, the crankcase 22 includes a right crankcase portion 22*a* and a left crankcase portion 22*b* (left and right sides being defined in such a way that the side corresponding to the right hand of a rider in a seated condition is the right side and the side corresponding to the left hand is the left side, this definition being equally applicable hereinafter), the left crankcase portion 22*b* of the crankcase 22 (the transmission box body) being provided, on an outer side (left side), with and covered by a cover 5 (transmission box cover) to form the transmission box 3, meaning the transmission box 3 is made up of the left crankcase portion 22*b* (the transmission box body) and the cover 5 (the transmission box cover) mating each other, in a covered arrangement, to provide a full-coverage fashion box cover, wherein the transmission box 3 defines an interior transmission space to receive the belt continuously variable transmission system 4 to disposed therein in order to provide the belt continuously variable transmission system 4 located in the interior of the transmission box 3 with an effect of concealment, the output shaft 2212 of the crankshaft 221 being extended into the interior of the transmission box 3 to connected to the belt continuously variable transmission system 4; the belt continuously variable transmission system 4 includes a driving wheel 41 that is drivable by the output shaft 2212 of the crankshaft 221, a driven wheel 42 that is drivable by the driving wheel 41, a driving belt 43 that is connected between the driving wheel 41 and the driven wheel 42; with the driving wheel 41 being driven by the output shaft 2212 of the crankshaft 221, the driving belt 43 drives the driven wheel 42 to perform rotation of variable transmission, the driven wheel 42 being provided, at a center thereof, with a driving shaft 44, the driving shaft 44 functioning to output power generated by the engine 2.

As shown in FIGS. 3, 4, 5, and 6, the cover 5 is provided, at a front side thereof, with a joining surface 51 facing the left crankcase portion 22b of the crankcase 22, and the cover 5 uses the joining surface 51 to fix to the left crankcase portion 22b of the crankcase 22; the cover 5 is provided, at one side that is opposite to the joining surface 51, namely an outer side of the cover 5, with a bulged section 5a that protrudes outward in an axial direction of the crankshaft 211, and the bulged section 5a is provided, in a direction toward the cylinder portion 21, with a non-bulged section 5b that forms a stepped arrangement with respect to the bulged section 5a, meaning the bulged section 5a protrudes further outward than the non-bulged section 5b in the axial direction of the crankshaft 211; the cover 5 is provided, on an outer end edge of the joining surface 51, with a plurality of fastening blocks 52, and the cover 5 is provided, on the non-bulged section 5b, with an air inlet port portion 53, and the cover 5 is provided, on a rear end, with at least one air outlet opening 54, the present invention being embodied with an arrangement of two such air outlet openings 54; the air inlet port portion 53 is provided, on an outer circumferential rim, with a fitting rib 531, and the air inlet port portion 53 is provided with an air inlet opening 532, the air inlet opening 532 being fastened, at an outer side thereof, with a filter member 55, the air inlet port portion 53 being provided, at an outer side thereof, with and covered by an airflow guide hood 6; the airflow guide hood 6 is circumferentially provided with a fitting trough 61 toward the fitting rib 531 of the air inlet port portion 53, and the fitting trough 61 is filled therein with a leakage-prevention gasket 611; a front end portion of the airflow guide hood 6 is curvedly extended toward one side to form a guiding portion 62, an inner side of the airflow guide hood 6 is provided, as being extended from the front end 62a of the guiding portion 62 toward the rear side of the airflow guide hood 6, with at least one guiding rib 63, and the present invention is embodied with a plurality of such guiding ribs 63, so that the plurality of guiding ribs 63 define a plurality of guiding grooves 64; the airflow guide hood 6 is provided, on an outer circumference thereof, with a plurality of coupling blocks 65 corresponding to the fastening blocks 52 of the cover 5, so that with the airflow guide hood 6 being arranged to have the fitting trough 61 fit to and engage with the fitting rib 531 of the air inlet port portion 53, fastening hooks 7 that possess characteristics of quick disassembling are set to hook on and fasten the fastening blocks 52 and the coupling blocks 65, in order to have the airflow guide hood 6 securely fixed to and covering the air inlet port portion 53 of the cover 5.

As shown in FIGS. 3, 4, 5, and 6, with the airflow guide hood 6 being so securely fixed to and covering the air inlet port portion 53 of the cover 5, the guiding portion 62 of the airflow guide hood 6 is projecting frontward further than the front end portion 5c of the cover 5, and thus, a spacing distance is formed between the front end 62a of the guiding portion 62 of the airflow guide hood 6 and a front end portion 5c of the cover 5 to thereby define an airflow entrance opening T, and an airflow entrance chamber A is formed between the airflow guide hood 6 and the air inlet port portion 53, and further, by means of the airflow guide hood 6 being made as a hood of an inverted-U shape, the non-bulged section 5b of the cover 5 and the bulged section 5a are generally in alignment with each other, and speaking in a more specifical way, it means the cover 5 has an outer side, in the axial direction of the crankshaft 211, which, as a whole, is generally in an aligned form, and thus, causing no deterioration to an outside appearance of the entirety of the transmission box 3; when the engine 2 is started and the belt continuously variable transmission system 4 is put into operation, external fresh air enters from the airflow entrance opening T, and is conducted by the guiding portion 62 and the guiding grooves 64 to move toward the air inlet port portion 53 and reach into the airflow entrance chamber A, wherein the external fresh air, when entering the air inlet opening 532 within the airflow entrance chamber A, is subjected to filtering by the filter member 55, and then moving, through the air inlet opening 532, into the transmission box 3 to subject the belt continuously variable transmission system 4 to cooling, and finally discharging through the air outlet opening 54 to the outside of the transmission box, and further, an inner side of the airflow guide hood 6 is provided with at least one guiding rib 63 extending in a direction from the airflow entrance opening T toward the bulged section 5a, so that large-sized foreign objects (such as tree leaves and paper sheets) can be blocked from entry at the airflow entrance opening T, thereby preventing the filter member 55 from being blocked by the large-sized foreign objects to lose the functionality thereof; when the filter member 55 needs to be cleaned or replaced, an engineering operator only needs to remove the fastening hooks 7 to enable the airflow guide hood 6 to separate from the cover 5, and at this moment, the filter member 55 is exposed and the engineering operator may use a simple tool to remove the filter member 55 from the cover 5 to carry out cleaning or replacement engineering, without the need to remove the entirety of the cover 5 for cleaning or replacement engineering of the filter member 55, and as such, the cleaning or replacement engineering of the filter member 55 is made easy.

The primary efficacy of the present invention is that with the arrangement that the transmission box 3 includes a left crankcase portion 22b (the transmission box body) and an cover 5 attached to and covering the left crankcase portion 22b (the transmission box body); the transmission box 3 includes at least one airflow entrance opening T and an air outlet opening 54, the cover 5 being provided with an air inlet port portion 53, the air inlet port portion 53 including an air inlet opening 532, and a filter member 55 arranged outside of the air inlet opening 532, an airflow guide hood 6 being arranged to cover the air inlet port portion 53, the filter member 55 being located between the airflow guide hood 6 and the air inlet port portion 53, so as to, on the one hand, guarantee a space inside the transmission box 3, and, on the other hand, ease cleaning or replacement engineering of the filter member 55.

The second efficacy of the present invention is that the cover 5 is provided, on an outside surface, with a bulged section 5a protruding outward in an axial direction of a crankshaft, and is provided, in a direction from the bulged section 5a toward a cylinder portion 21, with a non-bulged section 5b that exhibits a stepped difference with respect to the bulged section 5a, the air inlet port portion 53 being arranged on the non-bulged section 5b, so as to, on the one hand, guarantee a space inside the transmission box 3, and, on the other hand, ease cleaning or replacement engineering of the filter member 55, to further guarantee the outside appearance of the transmission box 3.

The third efficacy of the present invention is that the air inlet port portion 53 is provided, on an outer circumferential edge thereof, with a fitting rib 531; the airflow guide hood 6 is provided, facing toward the fitting rib 531 of the air inlet port portion 53, with a fitting trough 61, the fitting trough 61 being provided, as being filled, with a leakage-prevention gasket 611, so as to ensure an effect of sealing for the airflow entrance chamber A between the airflow guide hood 6 and the air inlet port portion 53.

The fourth efficacy of the present invention is that a front end portion of the airflow guide hood 6 is curvedly extended toward one side to form a guiding portion 62, and the airflow guide hood 6 is provided, on an inner side thereof, with at least one guiding rib 63 extended in a direction from a front end 62a of the guiding portion 62 toward a rear end of the airflow guide hood 6, so as to, on the one hand, improve stiffness and strength of the guiding portion 62 and, on the other hand, enhance performance of conducting external fresh air into the transmission box 3.

The fifth efficacy of the present invention is that the at least one guiding rib 63 comprises a plurality of guiding ribs and the plurality of guiding ribs 63 define a plurality of guiding grooves 64, so as to, on the one hand, improve stiffness and strength of the guiding portion 62 and, on the other hand, enhance performance of conducting external fresh air into the transmission box 3.

The sixth efficacy of the present invention is that the cover 5 includes a joining surface 51, the joining surface 51 being provided, one a circumferential edge thereof, with a plurality of fastening blocks 52, and the airflow guide hood 6 is provided, on an outer circumferential edge thereof, a plurality of coupling blocks 65 corresponding to the fastening blocks 52, hooking members 7 being provided for hooking engagement with the fastening blocks 52 and the coupling blocks 6, so as to ensure an effect of connection of the airflow guide hood 6 and the cover 5 and to achieve an effect of quick disassembling for the airflow guide hood 6 and the cover 5.

The seventh efficacy of the present invention is that the airflow guide hood 6 includes a guiding portion 62, and the guiding portion 62 projects frontward further than the front end portion 5c of the cover 5, and the front end 62a of the guiding portion 62 of the airflow guide hood 6 and the front end portion 5c of the cover 5 form the airflow entrance opening T, so as to ensure an effect of external fresh air entering the transmission box 3.

The eighth efficacy of the present invention is that the airflow guide hood 6 and the air inlet port portion 53 of the cover 5 define therebetween an airflow entrance chamber A, so as to ensure that external fresh air is effectively filtered, before entering the transmission box 3.

The ninth efficacy of the present invention is that the transmission box body is arranged as a left crankcase portion 22b of the crankcase 22, so as to ease structuring of the transmission box 3.

The tenth efficacy of the present invention is that the airflow guide hood 6 is provided, on an inner side thereof, with at least one guiding rib 63 extending in a direction from the airflow entrance opening T toward the bulged section 5a, so as to block large-sized foreign objects (such as tree leaves and paper sheets) from entry at the airflow entrance opening T to thereby ensure performance of the filter member 55.

I claim:

1. A structure of an engine transmission box, the transmission box comprising a transmission box body and a cover arranged on and covering the transmission box body; the transmission box comprising at least one airflow entrance opening and an air outlet opening, wherein the cover is provided with an air inlet port portion, the air inlet port portion comprising an air inlet opening, and a filter member arranged outside of the air inlet opening, an airflow guide hood being arranged to cover the air inlet port portion, the filter member being located between the airflow guide hood and the air inlet port portion, wherein the cover comprises a joining surface, the joining surface being provided, on a circumferential edge thereof, with a plurality of fastening blocks, and the airflow guide hood is provided, on an outer circumferential edge thereof, with a plurality of coupling blocks corresponding to the fastening blocks, hooking members being provided in hooking engagement with the fastening blocks and the coupling blocks.

2. The structure of the engine transmission box according to claim 1, wherein the airflow guide hood comprises a guiding portion, the guiding portion projecting frontward further than a front end portion of the cover, wherein a front end of the guiding portion of the airflow guide hood and the front end portion of the cover form the airflow entrance opening.

3. The structure of the engine transmission box according to claim 2, wherein the airflow guide hood is provided, on an inner side thereof, with at least one guiding rib extending in a direction from the airflow entrance opening toward the bulged section.

4. The structure of the engine transmission box according to claim 2, wherein the airflow guide hood and the air inlet port portion of the cover define therebetween an airflow entrance chamber.

5. The structure of the engine transmission box according to claim 1, wherein the airflow guide hood and the air inlet port portion of the cover define therebetween an airflow entrance chamber.

6. The structure of the engine transmission box according to claim 1, wherein the transmission box body is formed of a left crankcase portion of a crankcase.

7. The structure of the engine transmission box according to claim 1, wherein the cover is provided, on an outside surface, with a bulged section protruding outward in an axial direction of a crankshaft, and is provided, in a direction from the bulged section toward a cylinder portion, with a non-bulged section that has a stepped difference with respect to the bulged section, the air inlet port portion being arranged on the non-bulged section.

8. The structure of the engine transmission box according to claim 1, wherein the air inlet port portion is provided, on an outer circumferential edge thereof, with a fitting rib, and the airflow guide hood is provided with a fitting trough facing toward the fitting rib of the air inlet port portion, the fitting trough being provided, as being filled, with a leakage-prevention gasket.

9. The structure of the engine transmission box according to claim 8, wherein a front end portion of the airflow guide hood is curvedly extended toward one side to form a guiding portion, and the airflow guide hood is provided, on an inner side thereof, with at least one guiding rib extended in a direction from a front end of the guiding portion toward a rear end of the airflow guide hood.

10. The structure of the engine transmission box according to claim 9, wherein the at least one guiding rib comprises a plurality of guiding ribs and the plurality of guiding ribs define a plurality of guiding grooves.

11. The structure of the engine transmission box according to claim 1, wherein a front end portion of the airflow guide hood is curvedly extended toward one side to form a guiding portion, and the airflow guide hood is provided, on an inner side thereof, with at least one guiding rib extended in a direction from a front end of the guiding portion toward a rear end of the airflow guide hood.

12. The structure of the engine transmission box according to claim 11, wherein the at least one guiding rib comprises a plurality of guiding ribs and the plurality of guiding ribs define a plurality of guiding grooves.

* * * * *